Sept. 6, 1966          O. JONES         3,270,421
CONSTRUCTION CALCULATING RULER
Filed March 7, 1963                    2 Sheets-Sheet 2
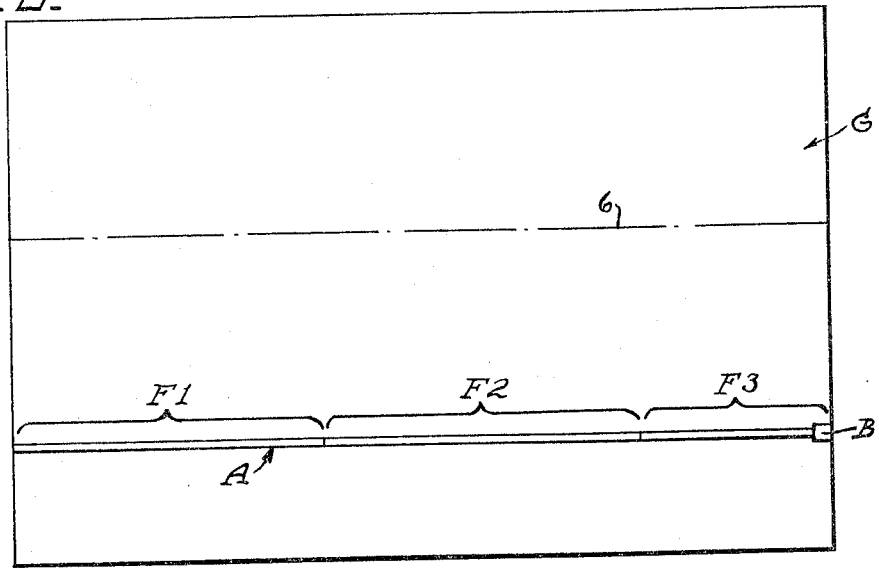
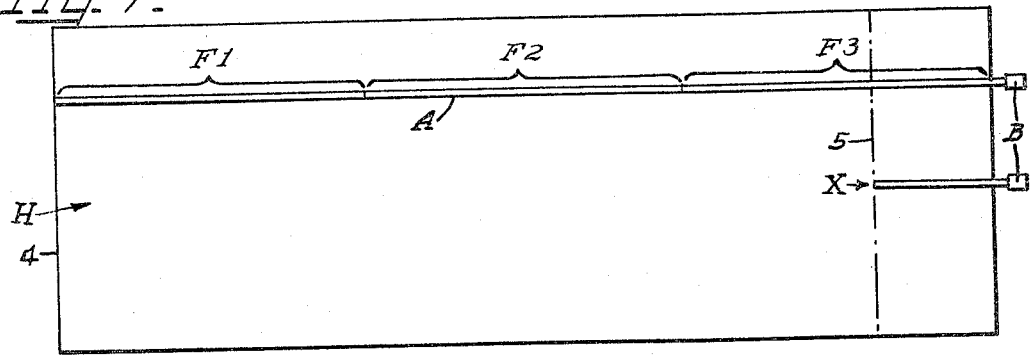
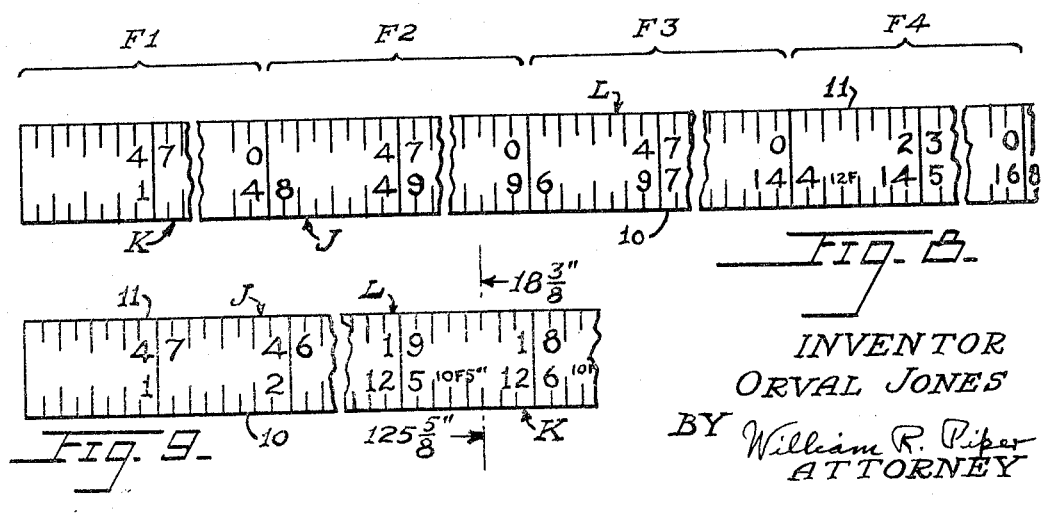
INVENTOR
ORVAL JONES
BY William R. Piper
ATTORNEY United States Patent Office 3,270,421
Patented Sept. 6, 1966

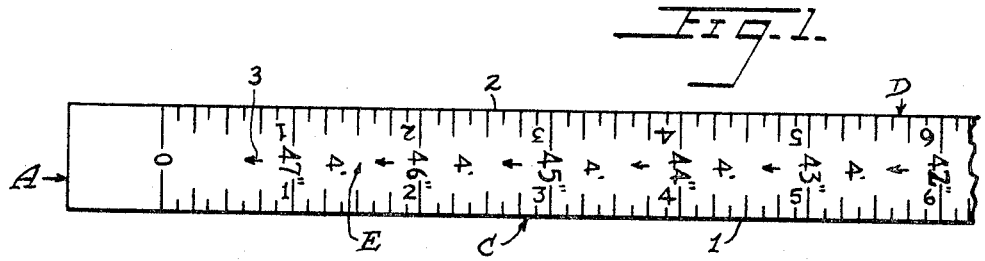

3,270,421
CONSTRUCTION CALCULATING RULER
Orval Jones, 1209 Knickerbocker Drive, Sunnyvale, Calif.
Filed Mar. 7, 1963, Ser. No. 263,562
1 Claim. (Cl. 33—137)

The present invention relates to improvements in a construction calculating ruler and it consists in the combination and arrangement of parts hereinafter described and claimed.

In the hanging of wallboard it is first necessary to measure the area that is to receive the wallboard. For example the workman measures the length of the wall in a room with a tape ruler and then applies this same measurement to a sheet of wallboard and places a mark on the wallboard at the measured point. He then takes the tape ruler and measures from the mark to the end of the board to determine how much to cut off from the board and finally uses this measured portion of tape as a guide and with a knife cuts the board along a line that parallels the end of the board.

Wallboard sheets are made of predetermined sizes. The customary sizes are sheets that are 48 inches in width and are usually eight, twelve or fourteen feet in length. The tape rule scale is normally marked off in inches. A mistake can occur when for example one workman measures the length of a room in inches and tells a second workman how much to cut off from a sheet of wall board and either the first workman tells the second one to make the cut from a sheet of the wrong length or the second one chooses the wrong length of board to cut.

An object of my invention is to provide a construction calculating ruler that will indicate on the ruler at the point where the length of the wall is indicated, the length of the portion to be cut from the wallboard and will also indicate on what proper length of wallboard the cut is to be made. One form of my tape ruler can be used by either right or left-handed workmen because duplicate main scales are arranged along both edges of the tape. The central portion of the tape or ruler has a subtracting scale thereon and markings on this scale are aligned with markings on the two main scales and will indicate the length of the portion to be cut from a wallboard of a given length. The numbers of the inches on the subtracting scale read in the opposite direction from the reading of the numbers of the inches on either main scale.

The subtracting scale is divided into successive sections of predetermined lengths. For example, if the calculating ruler has been calibrated to be used by a workman hanging wallboard, the first three successive sections will be 48 inches each and the fourth section will be 24 inches in length. Each of the first three sections will be numbered from 0 to 47 although each section is actually 48" long, and the fourth section will be numbered from 0 to 23, although this section is actually 24" long. In addition the first section of the subtracting scale will have the number 4' (meaning four feet) stamped thereon in one or more places and this indicates that any portion to be cut off must be done on a wallboard four feet in length. The second section of the subtracting scale will have the number 8' (meaning eight feet) stamped thereon and the third section will have the number 12' (meaning twelve feet) stamped thereon in one or more places. The fourth section of the subtracting scale will have the number 14' (meaning fourteen feet) stamped thereon in one or more places.

In a modified form of the construction calculating ruler I make use of only one main scale and arrange this along one edge of the ruler. The subtracting scale is arranged along the other edge of the ruler and is divided into sections that are arranged in successive order. The inches in each section start from 0 in each section and ascend in order up to 48, although the number 48" does not appear on the scale. The sections could be of other predetermined lengths. The device can be used by carpenters and other workmen.

The device is extremely simple in construction and is durable and efficient for the purpose intended.

Other objects and advantages will appear as the specification continues. The novel features of the invention will be set forth in the appended claim.

Drawings

For a better understanding of my invention, reference should be made to the accompanying drawings, forming part of this specification, in which:

FIGURE 1 is a plan view of a portion of my construction calculating ruler shown in full scale;

FIGURE 2 is a plan view of an entire length of my ruler with portions broken away, the figure illustrating the four successive sections forming the ruler;

FIGURE 3 is a plan view of a portion of my ruler and indicating the 16" and 32" markings thereon;

FIGURE 4 is a plan view similar to FIGURE 1, but showing the ruler extending in an opposite direction and being provided with a casing having a spring wind-up mechanism for the ruler;

FIGURE 5 is a plan view of a portion of the ruler shown at full scale and indicates how the ruler will calculate the length of the wallboard portion that is to be removed when the total length of the room wall is indicated by the ruler;

FIGURE 6 illustrates a wall of a room and shows my construction calculating ruler on a much smaller scale and measuring off the length of the wall;

FIGURE 7 is a plan view of one standard size of wall board, 48" x 144" and illustrates my construction calculating ruler applied thereto for indicating the length of the wallboard that will equal the length of the room wall to which the wallboard is to be applied. The same figure also illustrates how the tape ruler can be used as a measuring medium for guiding a knife from side to side of the wallboard for cutting it just prior to removing the excessive portion of the board;

FIGURE 8 is a plan view of a modified form of my ruler and is shown at full scale. The figure indicates the four different successive sections into which the length of the ruler may be divided; and FIGURE 9 is a plan view of a portion of the modified ruler shown at full scale and indicates how the ruler will calculate the length of the wallboard portion that is to be removed when the total length of the room wall is indicated by the ruler.

While I have shown only the preferred form of my invention, it should be understood that various changes, or modifications, may be made within the scope of the annexed claim without departing from the spirit thereof.

Detailed description

In carrying out my invention, I will describe the form of my construction calculating ruler shown in FIGURES 1 to 4 inclusive. The tape ruler is shown generally at A, and it is removably connected to a spring actuated take-up mechanism, not shown, that is housed within a casing B, see FIGURE 4. The tape ruler A, is preferably made of flexible metal that has a slight transverse arc formed therein.

The ruler A has two main duplicate scale indicated at C and D. The scale C is arranged along the edge 1 of the ruler A while the scale D is arranged along the other edge 2 of the ruler. The two main scales C and D permit the ruler to be used by right or left-handed operators. When an operator wants to use a main scale in which the numbers read in ascending order from left to right, he uses the scale C as shown in FIGURES 1, 2 and 3. When an operator wants to use a main scale in which the numbers read in ascending order from right to left, he uses the scale D as shown in FIGURE 4. Since both main scales are identical to each other, a description of the main scale C will suffice for both.

FIGURE 1 shows the main scale C, graduated in inches with the distances between each inch mark being divided into eighths. It is possible to have the divisions in sixteenths if desired. The scale C may be of any length desired. In the drawings, I have indicated the scale length as being 168 inches or fourteen feet, see FIGURE 2. The scale C is marked off in inches in ascending order from 0 to 168. At every twelve inches on the scale the number indicating inches is preferably made red in color. For example, the numbers 12, 24, 36, 48, 60, 72, 84, 96, 108, 120, 132, 144, 156, and 168 would all be in red color or the background immediately surrounding these numbers would be red. In FIGURE 2, the tape rule A has been broken at a number of places and the numbers 48, 96, 144 and 168 in this figure would be made red.

Since the entire scale C is graduated in inches, I have shown characters 1F up through 13F on the scale to indicate feet. For example from 12 through 23 on the scale, the characters 1F would follow each inch representing number and the operator would know that this meant "one foot." In FIGURE 2, the characters 4F (standing for four feet) are shown adjacent to the inch number 48. Also next to 96 appears the characters 8F standing for "eight feet." The characters 12F associated with the inch indicating numbers 144 and 145 stand for "twelve feet."

In FIGURE 3, the inch indicating numbers 16 and 32 have the transverse lines associated with these numbers in red. The rule can be used by carpenters and they use the number 16 and multiples thereof to place the studs in buildings at sixteen inch centers.

The central portion of the ruler A has a subtracting scale E that is placed between the two main scales C and D and is coextensive therewith. The substracting scale E is divided into four consecutive sections F1, F2, F3 and F4, see FIGURE 2. The sections F can be for any predetermined lengths desired. When the rule is to be used for measuring wallboard the first three sections F1, F2 and F3 are each forty-eight inches long. The section F1 in FIGURE 2 has its two end portions shown. The ascending numbered inches in this section are read from right to left. A 0 is placed between the two numbers 48 and a 47 is placed between the two numbers 1. The small arrows 3 disposed adjacent to the 0 and 47 in the subtracting scale E, indicate in which direction the measurements in this scale should be read.

In like manner the sections F2 and F3 have their two end portions shown, the portions of the ruler lying between these end portions being broken away. Both the ascending numbered inches in these sections are read from right to left. In this section F2, a 0 is placed between the two numbers 96 and a 47 is placed between the two members 49. Also in section F3, a 0 is placed between the two numbers 144 and a 47 is placed between the two numbers 97. The small arrows 3 disposed adjacent to the 0 and 47 in both sections F2 and F3 of the subtracting scale E, indicate in which direction the measurements in this scale should be read.

The fourth section F4 in FIGURE 2 is twenty-four inches long and has its two end portions shown. The ascending numbered inches in this section are also read from right to left. A 0 is placed in the subtracting scale E between the two numbers 168 in the main scales C and D, and a 23 is placed between the two numbers 145. The small arrows 3 disposed adjacent to the 0 and 23 in the subtracting scale E, indicate in which direction the measurements in this scale should be read.

*Operation*

From the foregoing description of the various parts of the device, the operation thereof will be readily understood. I show a room wall at G in FIGURE 6. The room is eight feet high and the length of the wall 125⅝ inches. This is merely an arbitrary length for a room wall in order to show how my construction calculating ruler operates. In FIGURE 7, I show a wallboard sheet H which is 48 inches wide and 144 inches long. Wallboard is manufactured in various standard sizes and I am giving this size merely as one example as to how my construction calculating ruler can be used for determining how much of the wallboard shown at H in FIGURE 7 must be cut off to make the wallboard length equal to the length of the room.

The operator takes the ruler A and measures the length of the room wall G in FIGURE 6 and finds the length to be 125⅝. The ruler A in FIGURE 6 has been extended from the casing B, so as to expose sections F1 and F2 and a part of section F3. The operator then takes the same length of 125⅝" of the tape A and applies it to the long side of the wallboard sheet H which is 48" x 144". One end of the tape is placed at the left hand edge 4 of the wallboard and the tape is extended until the operator reads the length of 125⅝ on the main scale C. He then glances at the portion of the subtraction scale E that is disposed adjacent to the mark of 125⅝ on the main scale and he notes that the number 18 appears between the number 126 of the main scales C and D, and that there are three "eighth division marks" reading to the left of the number 18 until he reaches the mark on the main scale C corresponding to the five eights of an inch. He then knows that the number he must subtract from the 144 wallboard must be 18⅜". The base number 12' appearing in the subtracting scale E space between the inch-indicating numbers 18 and 19 shows the operator that he must cut this 18⅜" portion from a wallboard standard sheet that is twelve feet long.

It is possible to use the tape ruler A on the room wall G and measure the length of the room directly on the tape and obtain from the tape the number 125⅝". Then the subtracting scale E can be immediately examined and the operator will note the number of 18⅜" on this scale. He can then take the rule A and measure the 18⅜" on it and place the rule on the wallboard H, as shown at position X in FIGURE 7. The operator can now use a wallboard cutting knife, not shown, and place the cutting edge adjacent to the end of the ruller A and then move the ruler for causing the knife to cut along the line 5 on the board. The board can then be broken along the cut line and this completes the operation.

In FIGURES 8 and 9, I show a modified form of ruler. The ruler J is preferably formed from the usual flexible metal that can be wound up into the casing B, shown in FIGURE 4, when the ruler is not being used. In referring to FIGURE 8, it will be seen that the ruler J has a scale K marked off along its lower edge 10 and this scale may be of any length desired. I have indicated the scale as being fourteen feet in length which is equivalent to 168 inches. The scale K is marked off in inches from 1 to 168 and the numbers are read from left to right. Each inch may be divided into any number of equal portions and I have shown the scale K divided into portions of ⅛ of an inch each.

I provide a second scale L and arrange this along the upper edge 11 of the rule or tape J. The scale L is preferably coextensive with the scale K and the scale L is divided into a number of successive sections. In the modified form, I have shown the scale K divided into the same three sections of 48 inches each and a fourth section of 24 inches as in the preferred form. The section F1 covers the first 48 inches and this scale parallels the scale K. It will be noted, however, that the numbers in the scale section F1 are numbered form 0 to 47 and read from right to left while the numbers in the scale K read from left to right. The 0 marking on the scale F1 is associated with the same line on the scale that has the number 48 and the scale K. The number 47 on the scale section F1 is associated with the same line that is numbered 1 on the scale K. The scale for the first section F1 has been broken as indicated in FIGURE 8 because it would serve no purpose to show the intervening numbers on the scale section F1 disposed between the 0 and the number 47.

The next section F2 of 48 inches on the scale L immediately follows the section F1 and this scale section F2 is also numbered from 0 to 47 and the numbers read from right to left in this section. It will be noted from FIGURE 8 that the 0 on the scale section F2 is associated with a line that is numbered 96 on the scale K and this number stands for 96 inches. The number 47 on the scale section F2 is associated with a line that is numbered 49 on the scale K.

I prefer to have some distinguishing color that will set off the scale section F2 from the scale section F1. The ruler surface itself may be colored for the section F2 and be different from the surface coloring of the scale section F1. It is also possible to color the numbers from 0 to 47 on the scale section F2 different from the color of the numbers 0 to 47 on the scale section F1. I do not wish to be confined to any particular manner of creating contrasting colors between the scale sections F2 and F1.

The third scale section F3 shown in FIGURE 8 is also for a length of 48 inches and this scale section immediately follows the scale section F2. The numbers on the scale section F3 read from 0 to 47 and the number 0 is associated with a line on the scale that is numbered 144 on the scale K. The number 47 on the scale section F3 is associated with a line that is numbered 97 in the scale K. Again the coloring of the numbers in the scale section F3 may differ from the numbers on the scale sections F2 and F1. Also the numbers on the scale section F3 read from right to left in ascending order.

The last two feet or 24 inches on the ruler are designated as scale section F4. The numbers on this section read from 0 to 23 and read from right to left. The number 24 does not appear on this scale. The number 0 on the scale section F4 is associated with a line that is numbered 168 on the scale K while the number 23 on the scale section F4 is associated with a line that is numbered 145 on the scale K.

The operation of the modified form of the invention is the same as the preferred form. In FIGURE 9, I indicate the length of 125⅝ on the main scale K. The subtracting scale L shows a number 18⅜ which is in line with the number 125⅝". This indicates the length of the portion of the wallboard that must be cut from a wallboard sheet that is 144 inches long. The cut wallboard is shown by the dot-dash lines 6 in FIGURE 6. No further description need be given of the modified form of the device.

I claim:
A construction calculating ruler comprising:
(a) a first scale disposed along an edge of the ruler and divided into inches and fractions of inches starting from zero and ascending in one direction, the inch markings being designated 1, 2, 3, 4, etc., up to the full length of the scale;
(b) a second series of scales each being divided into inches with each successive scale being termed a section, these sections being arranged end to end to form connected scales; the division into inches in each section being designated 1, 2, 3, 4, etc., up to the full length of the section and ascending in an opposite direction to said first scale; the inch numbers in the second series of scale sections being aligned transversely on said ruler with the inch numbers in said first scale; and
(c) base numbers in each section of said second series of connected scales for designating the total lengths of the sections measured from the zero marking in said first scale, all of the base numbers in a section being the same and differing in value from the base numbers in each of the other sections and referring to the different lengths of the members to be cut, the base numbers in each successive section being increased in ascending order when measured from the zero marking in said first scale;
(d) whereby any desired distance in inches on the first scale when transversely aligned with an inch marking in one of said second series of scales, such said designated second scale marking will have the base number associated therewith to indicate the length of the member to be cut and the aligned inch marking in the designated second scale indicating the number of inches to cut off from the member so that the length of the remaining portion of the member will equal the chosen distance on said first scale.

References Cited by the Examiner
UNITED STATES PATENTS

| | | | |
|---|---|---|---|
| 787,974 | 4/1905 | Clark | 33—111 |
| 1,081,673 | 12/1913 | Keuffel | 33—137 |
| 1,372,691 | 3/1921 | Herrman | 33—111 |
| 1,469,944 | 10/1923 | Merrill | 33—111 |
| 1,976,861 | 10/1934 | Tombal | 33—111 |
| 2,063,423 | 12/1936 | Farrand | 33—138 |
| 2,692,437 | 10/1954 | Cook | 33—138 |

ROBERT B. HULL, *Primary Examiner.*

ISAAC LISANN, *Examiner.*

J. D. BOOS, *Assistant Examiner.*